United States Patent
Lumpkin

(10) Patent No.: US 8,740,239 B2
(45) Date of Patent: Jun. 3, 2014

(54) BICYCLE SLIDING DROPOUT

(75) Inventor: Wayne R. Lumpkin, Littleton, CO (US)

(73) Assignee: Alto Designs, LLC, Englewood, CO (US)

( * ) Notice: Subject to any disclaimer, the term of this patent is extended or adjusted under 35 U.S.C. 154(b) by 518 days.

(21) Appl. No.: 12/822,076

(22) Filed: Jun. 23, 2010

(65) Prior Publication Data

US 2011/0316250 A1 Dec. 29, 2011

(51) Int. Cl.
*B62K 25/02* (2006.01)
*F16H 7/14* (2006.01)

(52) U.S. Cl.
USPC .......................................... 280/288; 280/285

(58) Field of Classification Search
USPC .............. 280/284, 285, 288, 281.1, 278, 287, 280/274; 301/110.5, 124.2, 125
See application file for complete search history.

(56) References Cited

U.S. PATENT DOCUMENTS

| | | | | |
|---|---|---|---|---|
| 558,260 | A * | 4/1896 | Copeland | 403/217 |
| 628,082 | A | 7/1899 | Ennis | |
| 641,637 | A | 1/1900 | Caswell | |
| 3,507,518 | A * | 4/1970 | Stubbendick et al. | 280/444 |
| 3,610,659 | A * | 10/1971 | Gerarde | 280/169 |
| 4,424,981 | A * | 1/1984 | Maxwell, III | 280/288 |
| 4,967,867 | A | 11/1990 | Fuller | |
| 5,096,215 | A * | 3/1992 | Chonan | 280/284 |
| 5,546,665 | A | 8/1996 | Jackmauh | |
| 5,888,159 | A | 3/1999 | Liao | |
| 6,966,571 | B2 * | 11/2005 | Czysz | 280/279 |
| 7,287,772 | B2 * | 10/2007 | James | 280/288 |
| 7,520,361 | B2 | 4/2009 | Anzai | |
| 7,520,522 | B2 * | 4/2009 | Julliard et al. | 280/281.1 |
| 7,854,441 | B2 * | 12/2010 | Scurlock | 280/261 |
| 2006/0226631 | A1 | 10/2006 | Holroyd | |
| 2009/0236819 | A1 | 9/2009 | Scurlock | |
| 2011/0042917 | A1 * | 2/2011 | Cleveland | 280/288 |

FOREIGN PATENT DOCUMENTS

EP 0244885 * 11/1987

OTHER PUBLICATIONS

AhrensBicycles.com (Jun. 7, 2010) Sliding Dropouts; Website [Online] Available Web Site: http://www.ahrensbicycles.com/Sliding-Dropouts.htm; Last update: Mar. 22, 2008; Accessed on: Jun. 7, 2010.

Cyclingnews.com (Jun. 7, 2010) Sliding dropouts with built-in tensioners make for easy drivetrain setup while the split design allows belt drive compatibility; Website [Online] Available Web Site: http://www.cyclingnews.com/features/photos/us-cx-nats-race-tech-one-of-fishers-finest-shapes-up/98866; Last update: Unknown; Accessed on: Jun. 7, 2010.

Paragon Machine Works (Jun. 24, 2010) Seatstay Kit: Belt Drive Option for DS0004, DS0005, DS0006 and DS0007, Titanium; Website [Online] Available Web Site: http://www.paragonmachineworks.com/storename/paragonmachinework/dept/261332/ItemDetail-10508785.aspx; Last Update: Unknown; Accessed on Jun. 24, 2010.

(Continued)

*Primary Examiner* — Anne Marie M Boehler
(74) *Attorney, Agent, or Firm* — Swanson & Bratschun, L.L.C.

(57) ABSTRACT

A bicycle sliding dropout comprising a splitting body and a slider slidably engaging the splitting body. The splitting body comprises an inner body and an outer body, the inner and outer bodies being configured to abut each other vertically and matingly engage via a mechanical interface.

16 Claims, 15 Drawing Sheets

(56) References Cited

OTHER PUBLICATIONS

Paragon Machine Works (Jun. 7, 2010) Sliding Dropout: Flanged, Hanger, Titanium for DS0002; Website [Online] Available Web Site: http://www.paragonmachineworks.com/storename/paragonmachineworks/dept/261332/ItemDetail-10468689.aspx; Last Update: Unknown; Accessed on Jun. 7, 2010.

TrekDistrict.com (posted Oct. 28, 2008) Belt Tensioning; Website [Online] Available Web Site: http:trekdistrict.com/category/trek-district/page/4/; Last update: Oct. 28, 2008; Accessed on: Jun. 7, 2010.

\* cited by examiner

BICYCLE SLIDING DROPOUT

TECHNICAL FIELD

The present disclosure is directed to a bicycle dropout, and more particularly to a bicycle sliding dropout.

BACKGROUND

Conventional bicycles are traditionally driven by a chain. The chain transmits mechanical power from a crank sprocket to a rear sprocket. However, there are several disadvantages of using chains. First, chains require lubrication. Second, chains wear and become less efficient in transmitting power over time. Third, chains stretch with extended use and thus need to be replaced periodically. Fourth, chains may wear the teeth of the crank sprocket or rear sprocket requiring their replacement. Thus, the ability to use flexible belts on bicycles is desirable because belts offer increased wear resistance, quieter operation, and lubrication-free cleanliness. However, there are several issues that arise with the use of flexible belts.

First, unlike chains, belts are manufactured in a continuous loop. This creates an installation problem because belts cannot be broken to pass through a bicycle frame. Therefore, it is necessary to create a split in the frame through which the belt can pass. The split must be closeable, durable, and designed in such a way to maintain the structural integrity of the frame.

Second, similar to chains, belts must be tensioned to provide efficient transfer of mechanical power from the crank sprocket to the rear sprocket. Currently, several chain tensioning methods are available; however, all of the available options have drawbacks when applied to belts.

For conventional bicycles with multiple sprockets at the hub, a spring-loaded derailleur may be used to maintain the tension of the chain and to shift the chain between sprockets. However, on belt-driven bicycles, the belt alignment between the crank sprocket and the rear sprocket is critical. Thus, spring-loaded derailleurs are not desirable because they increase the risk of misalignment. Additionally, spring-loaded derailleurs are not preferred by some riders because of their bulkiness.

Horizontal dropouts are another chain tensioning alternative. Horizontal dropouts, more commonly known as track ends, are the oldest method of tensioning a chain for a single speed drive train on a bicycle. The rear axle is mounted in a horizontally elongated dropout. Sliding the rear axle back and forth within the horizontal dropout changes the distance between the rear sprocket and the crank sprocket, thus changing the tension of the chain. However, wheel misalignment is somewhat common in horizontal dropouts because of axle slippage. Additionally, it can be difficult to align disk brakes on bicycles that have horizontal dropouts because adjusting the rear axle to tension the chain causes the wheel-mounted disk brake to de-align and ultimately lose contact with the frame-mounted brake caliper.

Eccentric bottom brackets provide yet another chain tensioning alternative. An eccentric bottom bracket offsets the axis of the crank bearing from the center axis of the bottom bracket and the center axis of the bottom bracket shell. Rotating an eccentric bottom bracket about its center axis changes the distance between the crank sprocket and the rear sprocket, thereby changing the tension of the chain. However, eccentric bottom brackets are notorious for being creaky, which can be rectified, but usually requires a tear down of the bottom bracket assembly. Additionally, eccentric bottom brackets are heavier than other chain tensioning alternatives.

What is needed is a bicycle dropout that accommodates installation of a belt or chain though a bicycle frame, provides an efficient means of tensioning the belt or chain to maximize power transmission from the crank sprocket to the rear sprocket, removes the need of realigning disk brakes every time the belt or chain is tensioned, and reduces slippage of the axle after the belt or chain is tensioned.

The various embodiments described herein are intended to overcome one or more of the problems discussed above.

SUMMARY OF THE EMBODIMENTS

In accordance with one embodiment, a bicycle sliding dropout comprises a slider and a vertically splitting body. The slider comprises an axle receptacle. The splitting body comprises a first body part and a second body part. The splitting body and the slider are configured for slidable engagement relative to one another when operatively associated so that the slider may slide fore and aft relative to the splitting body. The first and second body parts are configured to matingly engage vertically via mechanical interlock. The mechanical interlock may be a flange and groove interface. The means for slidable engagement may comprise aligned substantially horizontal slots in the first and second body parts and an extended boss on the slider received in the substantially horizontal slots.

In accordance with another embodiment, a bicycle sliding dropout comprises a slider and a splitting hood body. The slider comprises an upper surface, an extended boss, and an axle receptacle. The splitting hood body comprises first and second body parts. The first body part comprises a horizontal slot, the horizontal slot of the first body part being configured to receive the extended boss and to allow the extended boss to slide horizontally therein. The second body part comprises a horizontal slot and a hood, the horizontal slot of the second body part being configured to receive the extended boss and to allow the extended boss to slide horizontally therein, and the hood comprising a bottom surface. The upper surface of the slider is configured to abut the bottom surface of the hood.

In accordance with a further embodiment, a bicycle sliding dropout comprises a slider and a hood body. The slider comprises an upper surface, an extended boss, and an axle receptacle. The hood body comprises a horizontal slot and a hood having a bottom surface, the horizontal slot being configured to receive the extended boss and to allow the extended boss to slide horizontally therein. The upper surface of the slider is configured to abut the bottom surface of the hood in a manner preventing relative rotation therebetween.

In accordance with yet another embodiment, an axle receptacle for a cycle comprises a vertical dropout. The vertical dropout comprises an opening, a receiving hole spaced from the opening, a forward surface, and an aft surface, the receiving hole is inset into the forward surface such that a radial portion of an axle received in the opening may be received therein.

DETAILED DESCRIPTION

Unless otherwise indicated, all numbers expressing quantities of ingredients, dimensions, reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Figure 1:
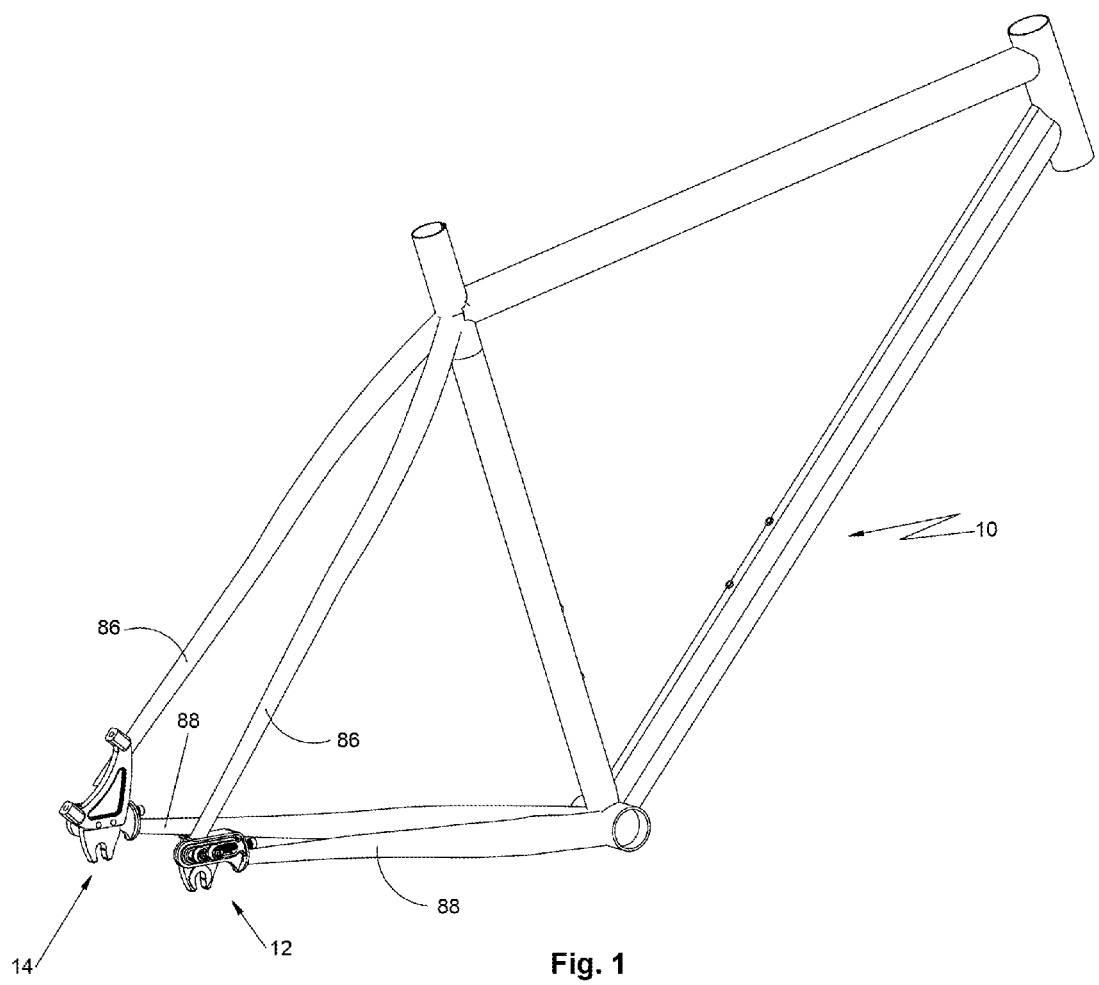
FIG. 1 is a perspective view of a bicycle frame having embodiments of a bicycle sliding dropout.

FIG. 1 is a perspective view of a bicycle frame 10 incorporating a first embodiment (or a drive side) bicycle sliding dropout 12 and a second embodiment (or a non-drive side) bicycle sliding dropout 14.

Figure 2:
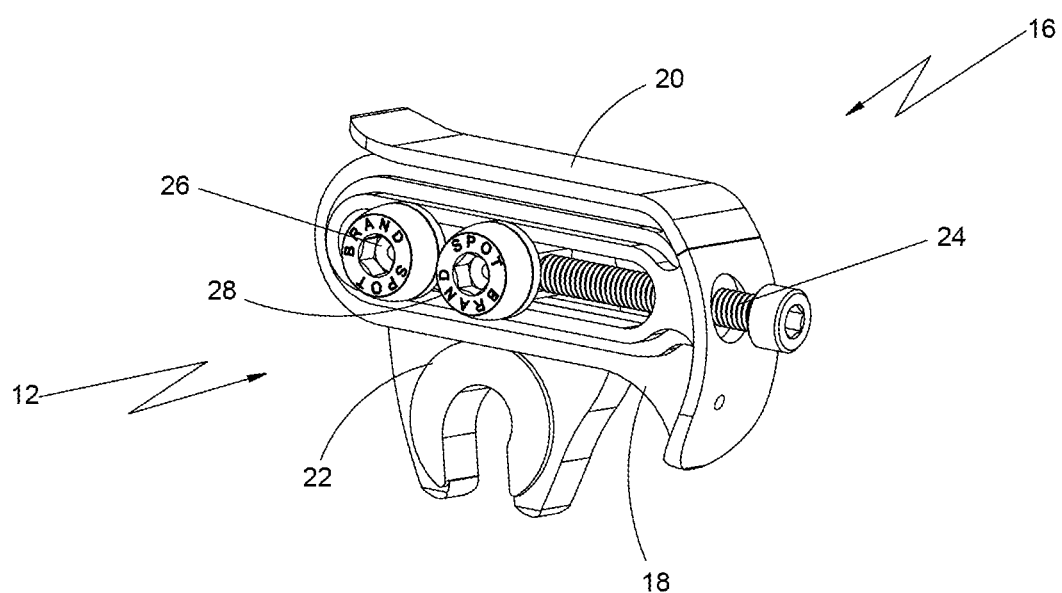
FIG. 2 is a front perspective view of a first embodiment of a bicycle sliding dropout.

FIG. 2 is a perspective view of the first embodiment or a drive side bicycle sliding dropout 12 in an assembled state. The first embodiment of the drive side bicycle sliding dropout 12 comprises a splitting body 16 which includes a first body part 18 (hereinafter an "inner hood body") and a second body part 20 (hereinafter an "outer hood body"). The sliding dropout 12 further includes a slider 22 which is driven into position by a tensioning screw 24 and held in place by threaded fasteners 26, 28. As depicted in FIG. 2, the splitting body includes a hood, though the hood is not necessary for the practice of the broadest aspect of the invention. In the description of the first illustrated embodiment, the body 16 and the inner and outer hood bodies 18, 20 will be referred to as "hood" bodies, though this is not intended to be limiting to the claims.

Figure 3:
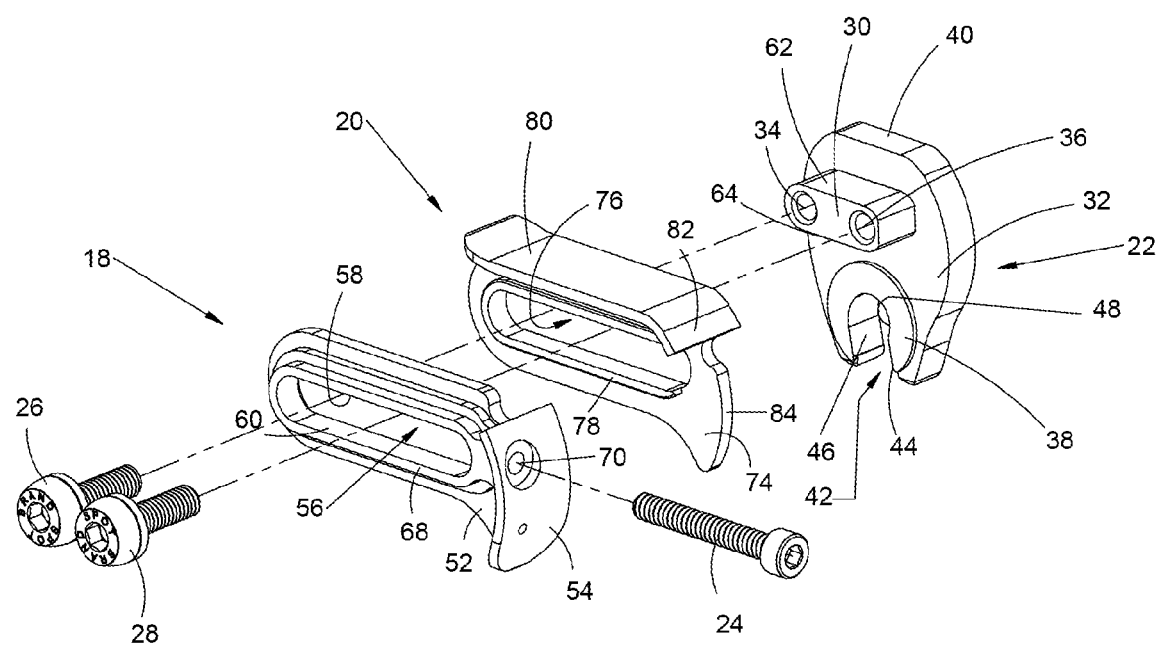
FIG. 3 is an exploded front perspective view of the embodiment of a bicycle sliding dropout of FIG. 2.

The sliding dropout 12 is shown in an exploded front perspective view in FIG. 3. As seen in FIG. 3, the slider 22 comprises an elongate extended boss 30 extending from the slider body 32. The extended boss 30 includes a pair of threaded holes 34, 36. Other embodiments may have only a single threaded hole or more than two threaded holes. The slider 22 further includes an axle receptacle 38 formed in a bottom of the slider body 32 with a substantially flat top surface 40 defined on the top of the slider body 32.

Figure 5:
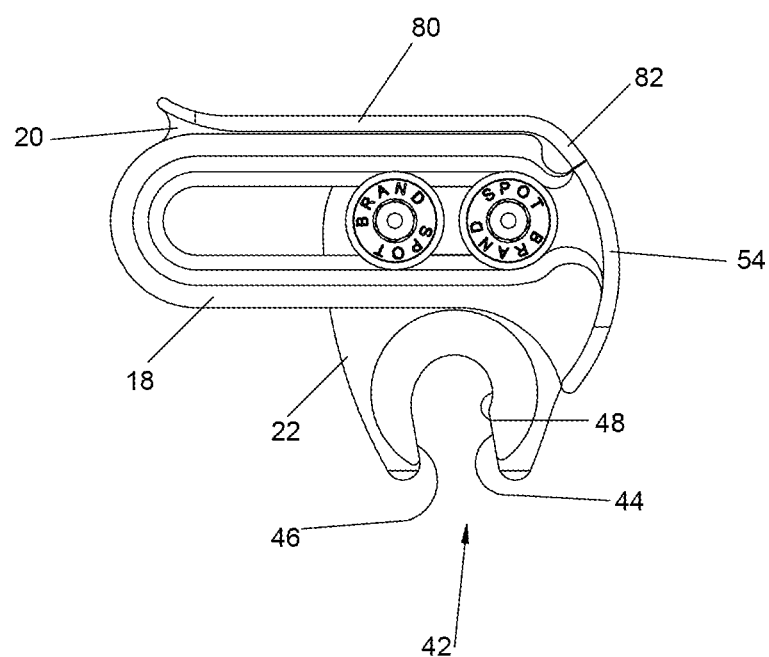
FIG. 5 is a front elevation view of the bicycle sliding dropout of FIG. 2 without a tensioning screw.

In various embodiments the axle receptacle 38 may comprise a standard vertical dropout which is known in the art. In the embodiment illustrated in FIG. 3, the axle receptacle 38 comprises an improved vertical dropout. The vertical dropout of the axle receptacle 38 comprises an opening 42, a forward surface 44 and an aft surface 46. The forward surface 44 is inclined counterclockwise from the opening 42 and has an axle receiving hole 48 defined in the forward surface 44 spaced from the opening 42 proximate the closed end of the axle receptacle 38. This arrangement is perhaps best seen in FIGS. 5 and 6. Referring to FIG. 5, the aft surface 46 appears parallel to the forward surface 44, but this is not necessary for the proper operation of the axle receptacle 38 as will be described in greater detail below. Significantly, the axle receiving hole 48 has a diameter selected to receive a radial portion of an axle of a wheel (not shown).

The inner hood body 18 comprises a web 52 oriented vertically in FIG. 3 with a forward hood 54 attached to the front of the web 52. An elongate horizontal slot 56 is further defined within the web 52. The horizontal slot 56 is configured to receive the extended boss 30 in a manner allowing the extended boss 30 to slide horizontally therein. A height of the horizontal slot 56 approximately corresponds to a height of the extended boss 30 such that, in use, a top surface 58 and a bottom surface 60 of the horizontal slot 56 engage a top surface 62 and a bottom surface 64 of the elongate extended boss 30, respectively. In this manner, relatively rotational movement between the slider 22 and the inner hood body 18 is substantially prevented.

Figure 4:
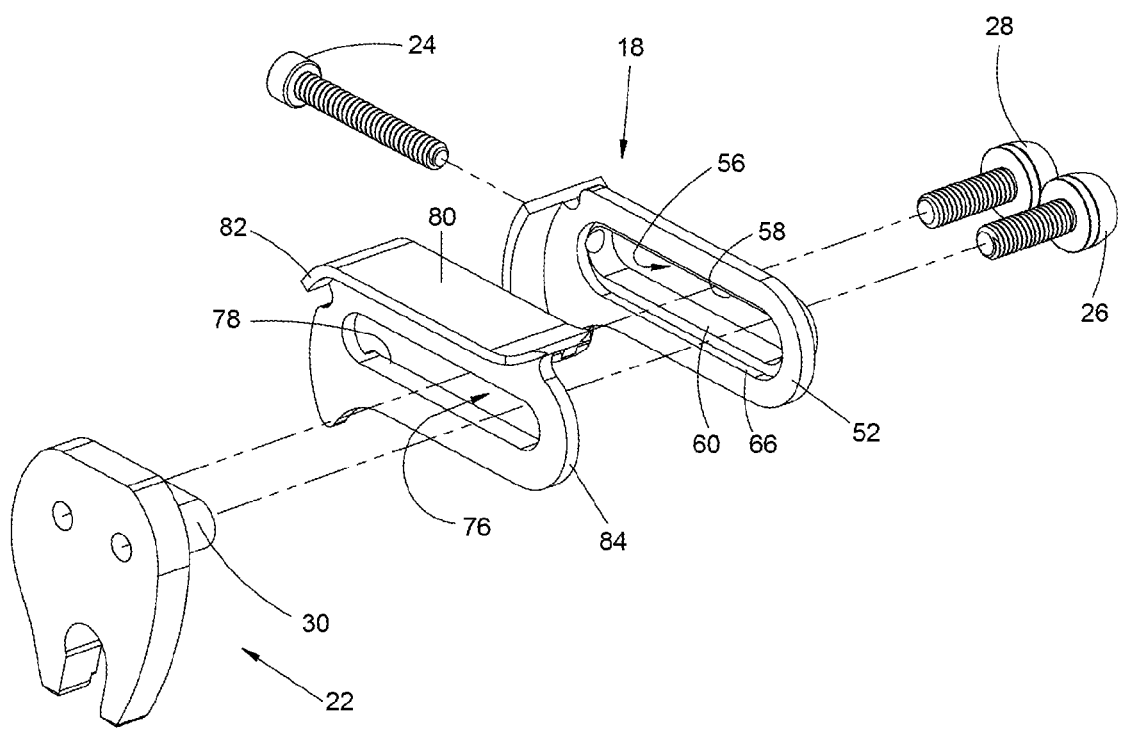
FIG. 4 is an exploded rear perspective view of the bicycle sliding dropout of FIG. 2.

Referring to FIG. 4, a surrounding groove 66 is defined in a back of the inner hood body 18 surrounding all but the forward portion of the elongate horizontal slot 56. The inner hood body 18 further includes a peripheral flange 68 extending from a front surface of the web 52 about the periphery of the elongate horizontal slot 56. As illustrated in FIG. 3, the forward and aft surfaces of the elongate extended boss 30 and the elongate horizontal slot 56 are configured to nest when brought into engagement.

The forward hood 54 of the inner hood body 18 is arcuate vertically and substantially perpendicular to the web 52 horizontally. An internally threaded through hole 70 is provided in the forward hood 54 and is dimensioned to threadably engage the tensioning screw 24. As will be discussed in greater detail below, tensioning screw 24 can bear upon the forward surface of the elongate extended boss 30 to position the slider 22 relative to the splitting hood body 16 with the sliding dropout 12 in an assembled state.

The outer hood body 20 comprises a web 74 defining an elongate horizontal groove 76 configured to correspond to the elongate horizontal slot 56 of the inner hood body 18. A surrounding flange 78 extends from the front of the web 74 about the periphery of the elongate horizontal groove 76 and is dimensioned to be received in the surrounding groove 66 in the back surface of the web 52 of the inner hood body 18. The surrounding groove 66 and the surrounding flange 78 are configured to fit snugly to substantially prevent relative movement between the inner and outer hood bodies 18, 20. Of course, in alternate embodiments, the surrounding groove 66 and the surrounding flange 78 would be associated with the other of the inner hood body and outer hood body, with the central feature merely being a flange/groove interface between the inner hood body 18 and the outer hood body 20. The surrounding groove 66 and the surrounding flange 78 illustrate an example of a mechanical interlock between the inner and outer hood bodies which prevents relative movement of the inner and outer hood bodies vertically, horizontally, or rotationally with the inner and outer bodies abutted vertically and matingly engaged.

Figure 6:
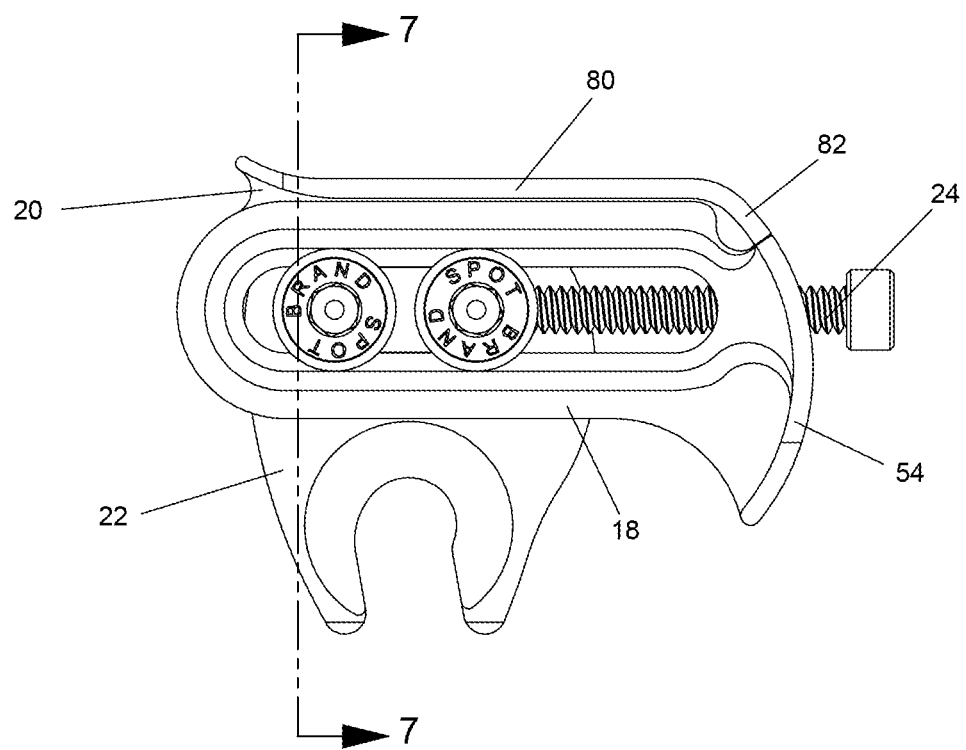
FIG. 6 is a front elevation view of the bicycle sliding dropout of FIG. 2.

The outer hood body 20 further includes a hood 80. As depicted in FIG. 3, the hood 80 is substantially perpendicular to the web 74 and has an arcuate forward portion 82. The arcuate forward portion 82 is configured to correspond to a radius of the forward hood 54 of the inner hood body 18 so that in an assembled state as illustrated in FIGS. 2, 5 and 6, the forward hood 54 and the hood 80 form a substantially continuous surface.

Figure 8:
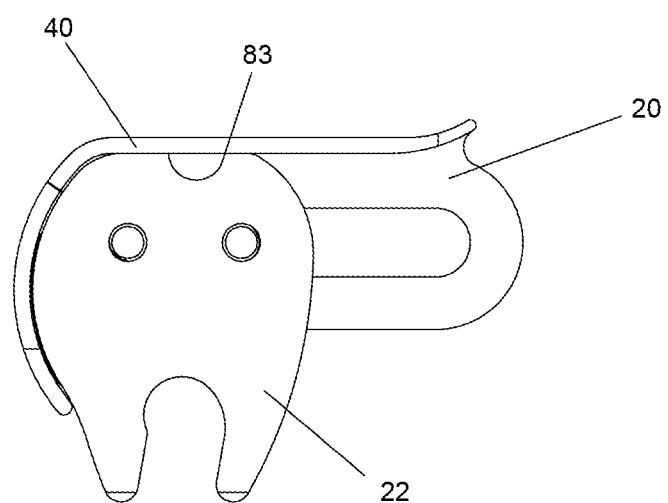
FIG. 8 is a rear elevation view of the bicycle sliding dropout of FIG. 2 without a tensioning screw.

The bottom surface of the hood 83 is configured to abut the top surface 40 of the slider 22 with the bicycle sliding dropout 12 in its assembled state. This relationship is best viewed in FIG. 8. A forward portion 84 of the web 74 is configured to correspond to an inner surface of the forward hood 54 to nest therewith.

The bicycle sliding dropout 12 is assembled by engaging the surrounding flange 78 of the outer hood body 20 with the surrounding groove 66 of the inner hood body 18, inserting the elongate extended boss 30 of the slider 22 into the aligned elongate horizontal slots 56, 76 of the inner hood body 18 and the outer hood body 20, respectively, and threadably engaging the threaded fasteners 26, 28 with the internally threaded holes 34, 36 of the elongate extended boss 30. The tensioning screw 24 can be selectively received in the internally threaded through hole 70 to a depth sufficient to position the slider 22 as desired by action of the leading end of the tensioning screw 24 abutting the forward surface of the elongate extended boss 30 of the slider 22. When positioned as desired, the threaded fasteners 26, 28 can be tensioned to hold the slider 22 in its position.

When deployed on a bicycle frame as illustrated in FIG. 1, a seat stay 86 is attached the hood 80 of the outer hood body 20 and a chain stay 88 is attached to a bottom portion of the forward hood 54. The stays may be attached to the hood portion using methods known in the art. Methods may include braising, welding or boding using adhesives. Preferably, chain stay 88 is welded to the forward hood 54 and the seat stay 86 is welded to the hood 80. As described herein, the hoods 80, 54 define stay attachment areas and are desirable for metal frames. Other stay attachment areas could be substituted for the hoods for metal frames or frames made of other materials, such as carbon fiber.

Figure 7:
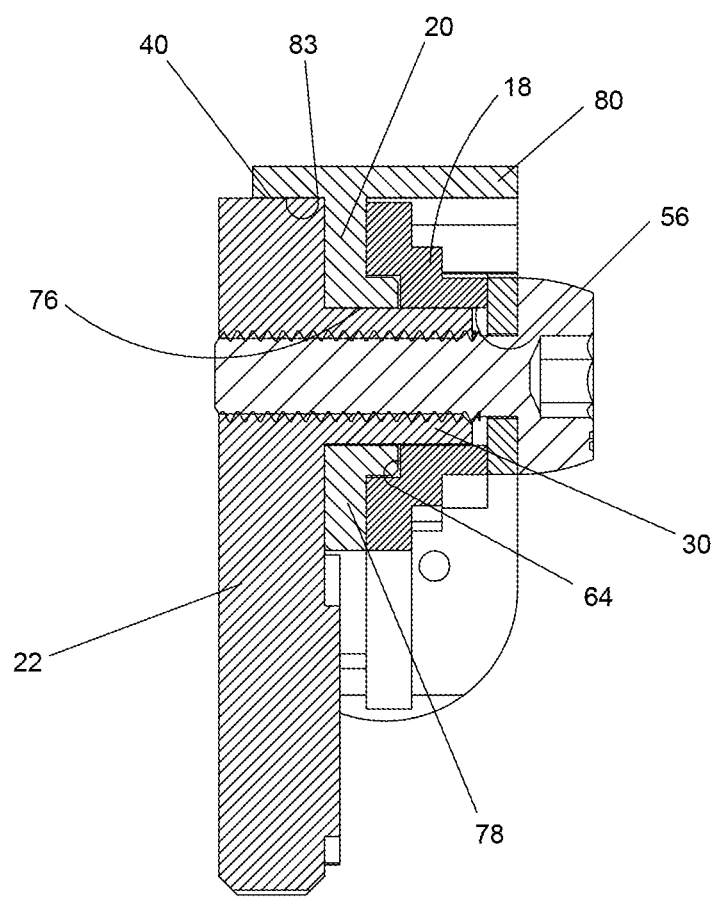
FIG. 7 is a cross-section view of the bicycle sliding dropout of FIG. 2 taken along line 7-7 of FIG. 5.

The mating engagement of the inner and outer hood bodies 18, 20 is perhaps best viewed in FIG. 7. There it can be seen that the surrounding flange 78 of the outer hood body 20 is received in the surrounding groove 66 of the outer hood body 20. Also viewed in FIG. 7 is the elongate extended boss 30 received in the elongate horizontal groove 76 of the outer hood body 20 and the elongate horizontal slot 56 of the inner hood body 18. Further illustrated in FIG. 7 is the abutment of the top surface 40 of the slider 22 with the bottom surface 83 of the hood 80. The abutment of the top surface 40 of the slider 22 and the bottom surface 83 of the hood 80 helps to prevent relative rotation between the slider 22 and the splitting hood body 16. Likewise, as described above, the relatively snug fit of the elongate extended boss 30 within the elongate horizontal grooves 76, 56 of the outer hood body 20 and the inner hood body 18, respectively, help to prevent rotation as between the slider 22 and the splitting hood body 16. Likewise the surrounding groove 66 and surrounding flange 78 interface between the inner hood body 18 and the outer hood body 20 act as a mechanical interlock to prevent relative movement therebetween.

Use of the sliding dropout 112 will be described in association with a belt. A conventional chain could be substituted for the belt. In use, a belt (not shown) can be associated with the frame 10 by removing the threaded fasteners 26, 28 and separating the seat stay 86 and the chain stay 88 by forcing the seat stay 86 inward and the chain stay 88 outward at the bicycle sliding dropout 12. The belt is then fit through a gap between the stays. Thereafter the threaded fasteners 26, 28 can be replaced and partially seated and the belt can be tensioned as desired by turning the tensioning screw 24 in a manner previously known in the art. Once the bicycle sliding dropout 12 is approximately positioned, the axle of a wheel can be slid up the inclined forward surface 44 of the axle receptacle 38 and dropped into the axle receiving hole 48 to maintain it in position against the action of the tension present in the belt. Thereafter the tensioning screw 24 can be further tensioned as desired and then the threaded fasteners 26, 28 can be securely tightened to lock the axle in place. A jam nut (not shown) may be used to lock the tensioning screw 24 in place once the desired tension is achieved. FIG. 5 illustrates the bicycle sliding dropout 12 without the tensioning screw 24 and the slider 22 moved fully forward. FIGS. 2 and 6 illustrate the tensioning screw 24 while fully inserted in the internally threaded through hole 70 and positioning the slider 22 rearward in the elongate horizontal slots of the inner and outer hood bodies.

During use, the threaded fasteners 26, 28 are solely in tension because shear loads, created predominately by the weight of a rider and peddling forces, are transmitted through the flange and groove interface of the splitting hood body 16, the abutting surfaces of the extended boss 30 and the horizontal slots of the inner hood body 16 and the outer hood body 20 and the interface of the top surface 40 of the slider 22 and the bottom surface 83 of the hood. Embodiments could use one or all of these interfaces to bear these loads so that the threaded fasteners are only in tension.

Figure 9:
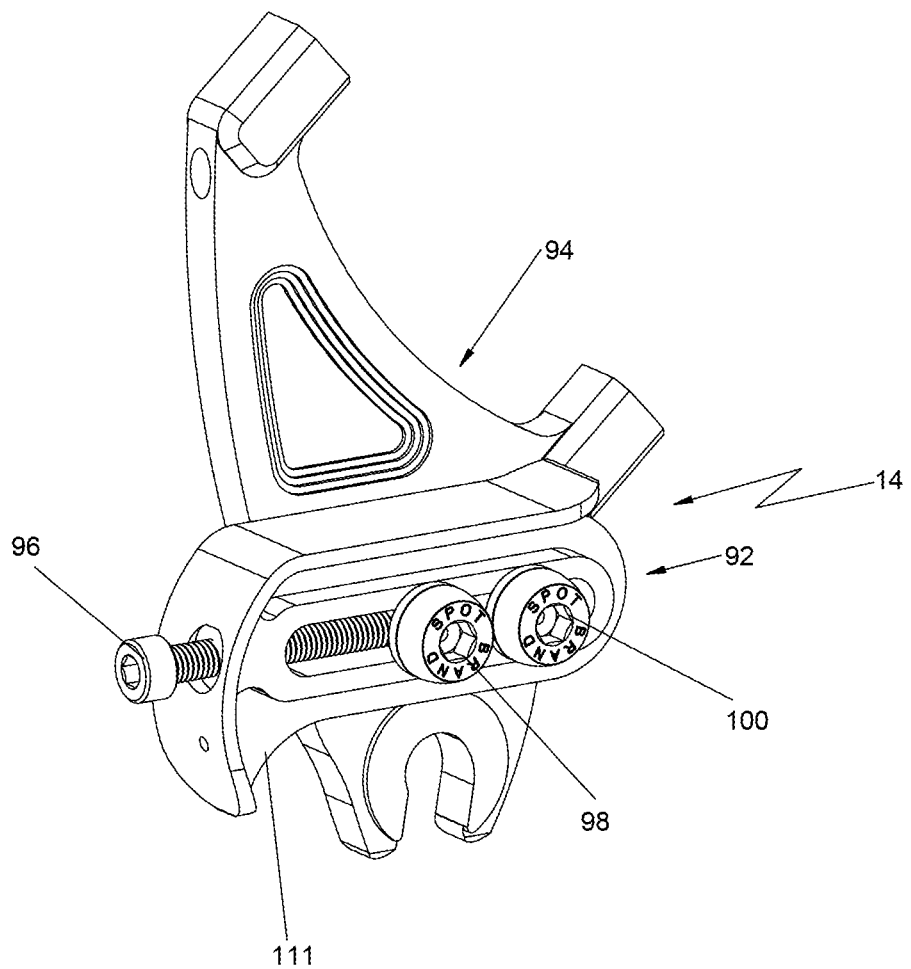
FIG. 9 is a front perspective view of a second embodiment of a bicycle sliding dropout.
Figure 10:
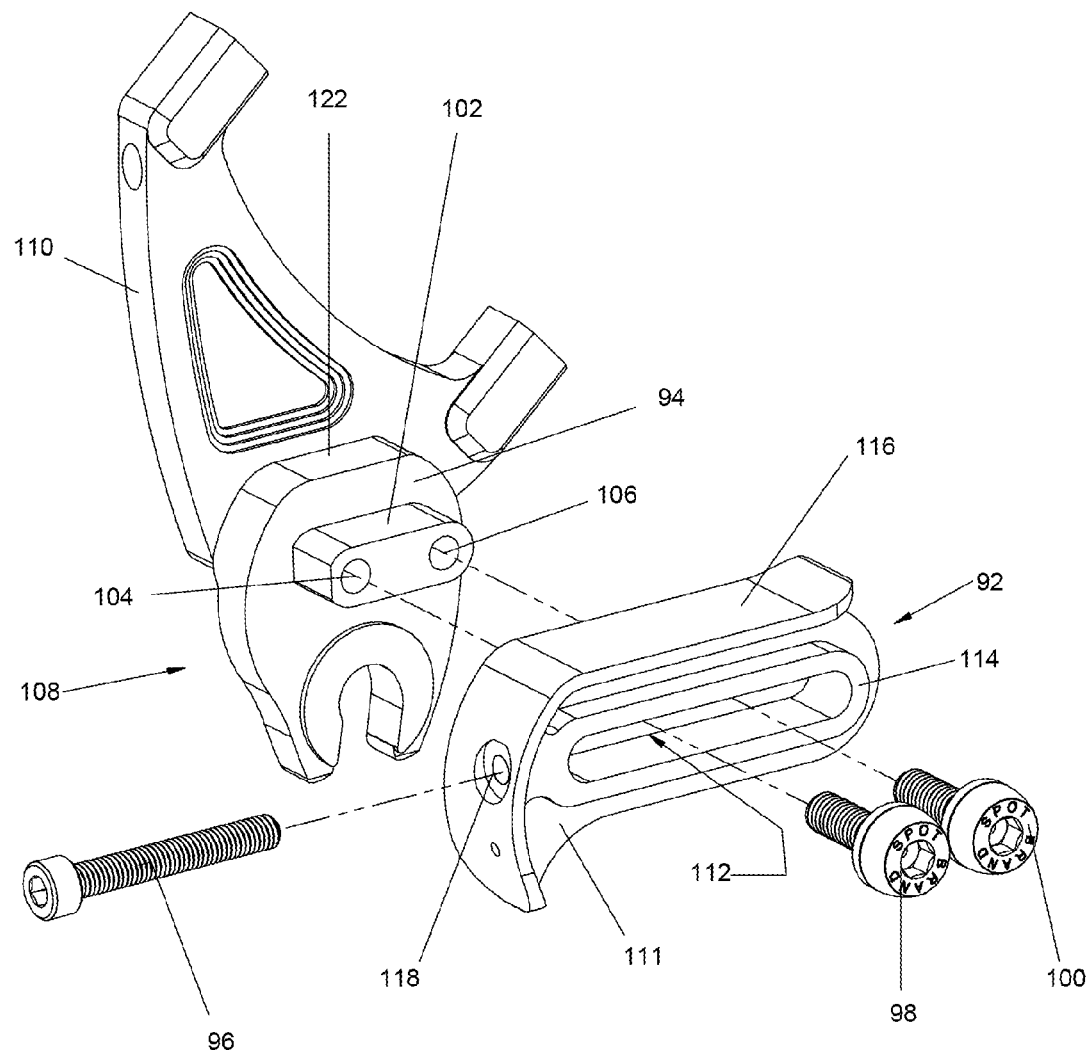
FIG. 10 is an exploded front perspective view of the bicycle sliding dropout of FIG. 9.
Figure 11:
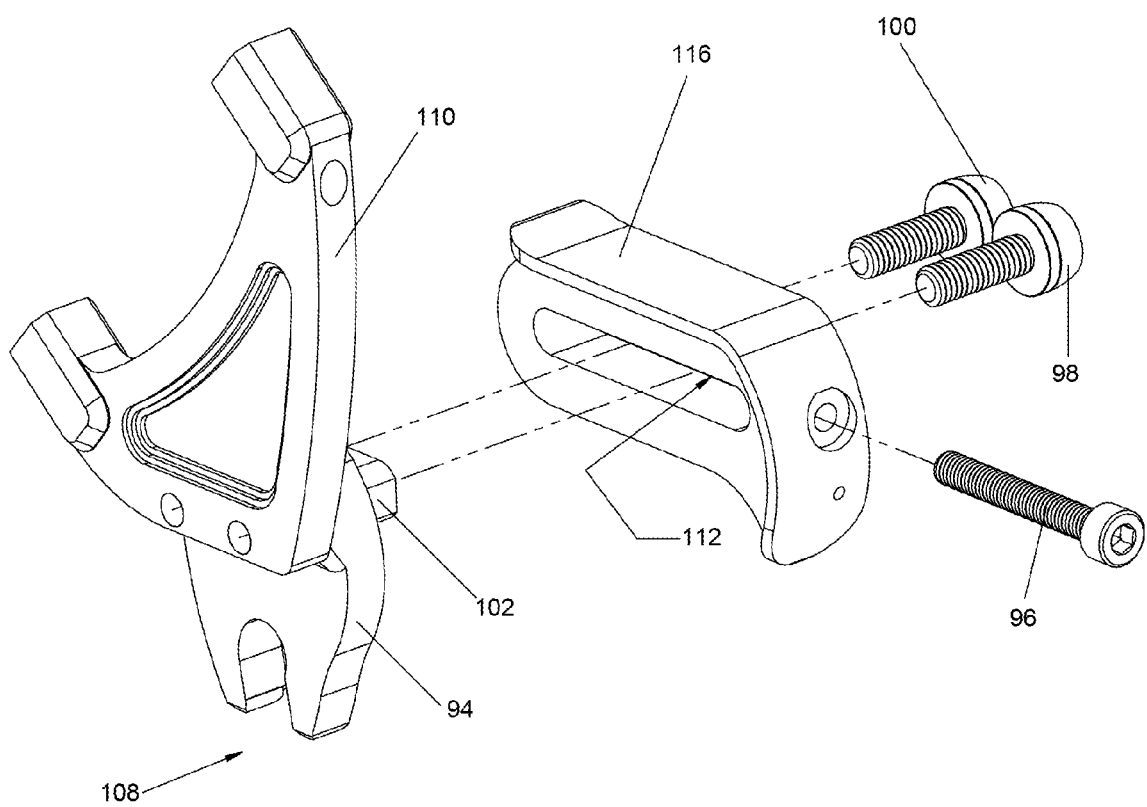
FIG. 11 is an exploded rear perspective view of the bicycle sliding dropout of FIG. 9.
Figure 12:
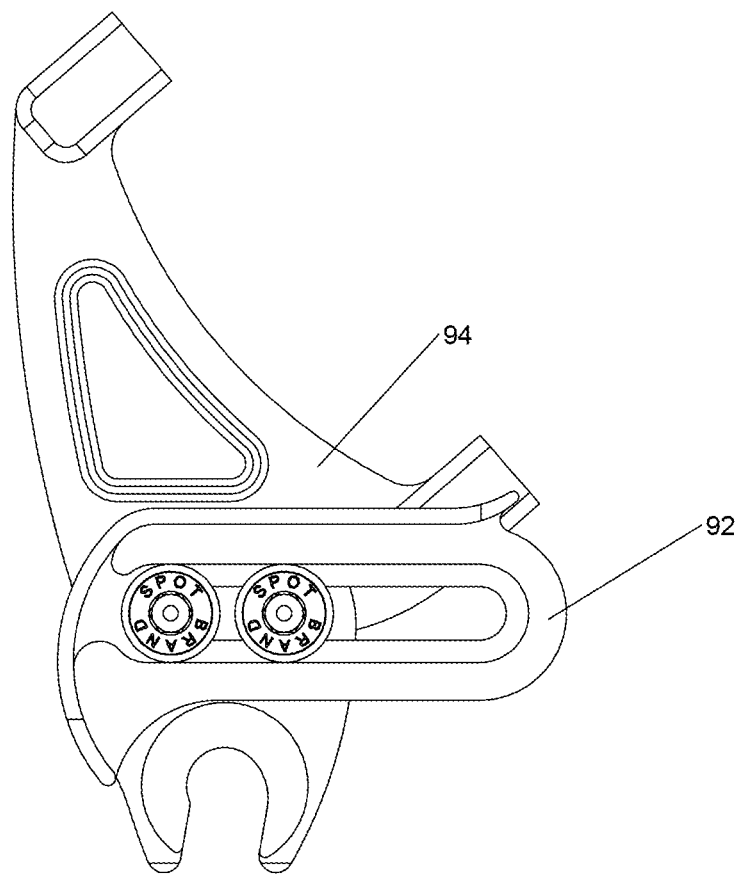
FIG. 12 is a front elevation view of the bicycle sliding dropout of FIG. 9 without a tensioning screw.
Figure 13:
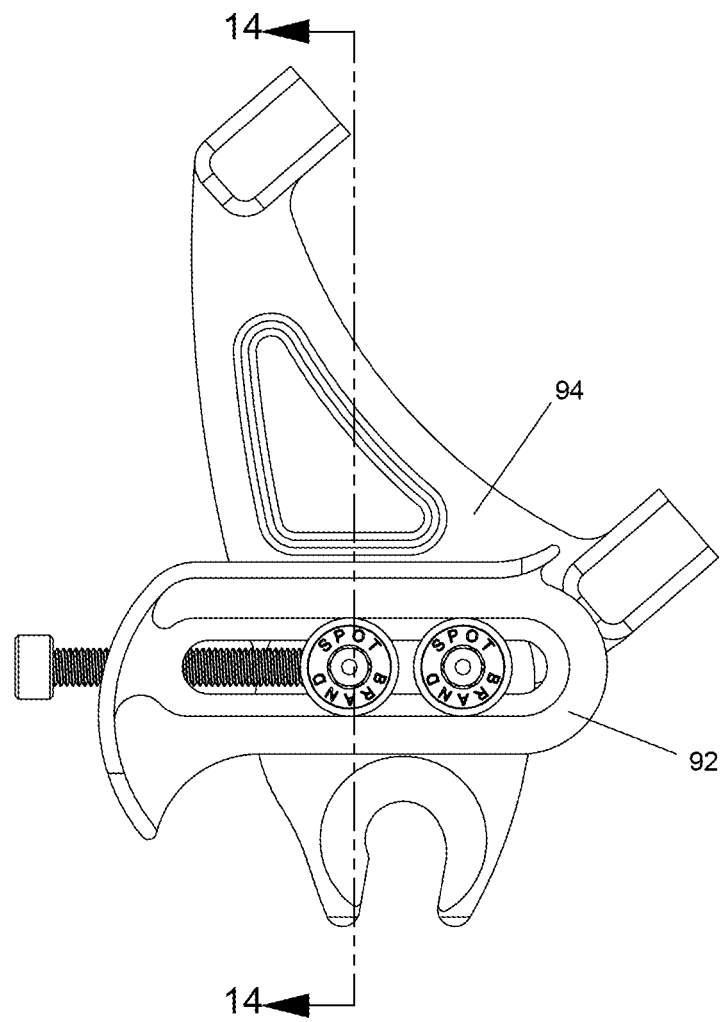
FIG. 13 is a front elevation view of the bicycle sliding dropout of FIG. 10.
Figure 14:
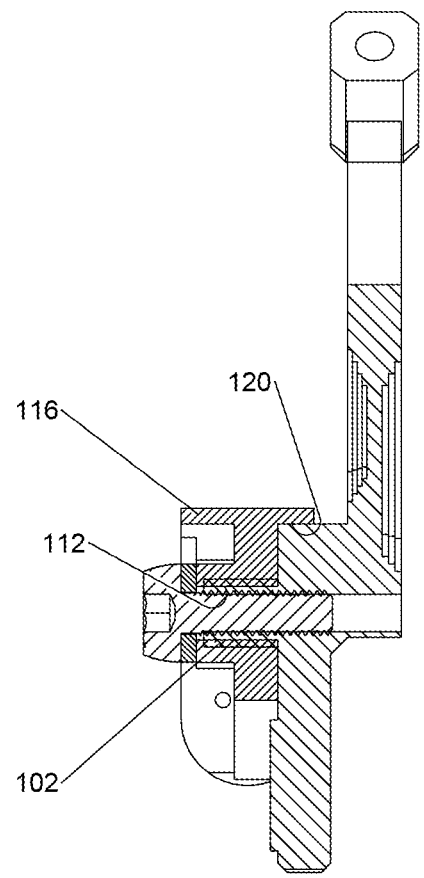
FIG. 14 is a cross-section view of the bicycle sliding dropout of FIG. 9 taken along line 14-14 of FIG. 13.
Figure 15:
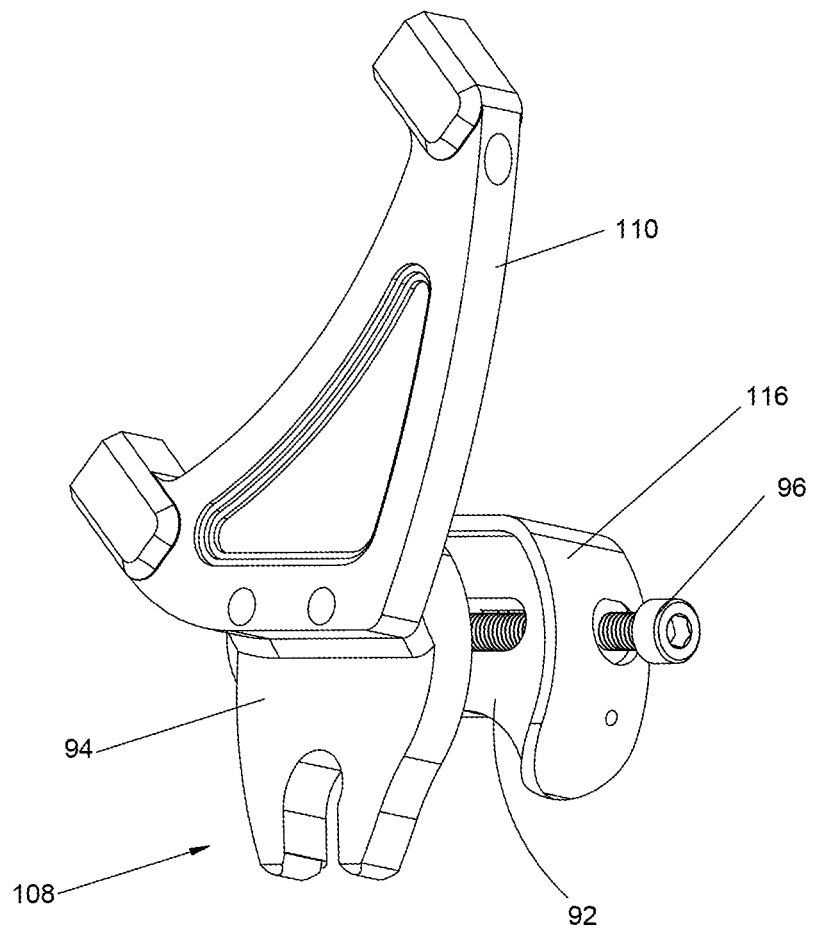
FIG. 15 is a rear perspective view of the bicycle sliding dropout of FIG. 11.

A second embodiment (for non-drive side) of a bicycle sliding dropout 14 is illustrated in FIG. 9. This embodiment comprises a hood body 92 and a brake mount slider 94 which are positioned relative to one another by a tensioning screw 96 and secured in place by threaded fasteners 98, 100. The second embodiment 14 is shown in an exploded view in FIG. 10. The brake mount slider 94 is similar to the slider 22 described in the first embodiment in that it includes elongate extended boss 102 having threaded holes 104, 106 configured to receive the threaded fasteners 98, 100, respectively. The slider 94 further includes an axle receptacle 108 that is identical to the configuration of the axle receptacle 38 described above with respect to the first embodiment 12. The primary difference between the slider 94 and the slider 22 is the attachment of a disc brake post mount 110 to the back side of the slider 94. The disc brake post mount 110 and the slider 94 may be integrally formed as one part. Alternatively, the disc brake post mount 110 may be manufactured as a separate part and attached to the slider 94 using known methods in the art, including fasteners, braising, welding or bonding using adhesives.

The hood body 92 includes a web 111 defining an elongate horizontal slot 112. The elongate horizontal slot 112 is dimensioned in the same manner relative to the elongate extended boss 102 of the slider 94 as the elongate extended boss 30 is to the elongate horizontal slots 56, 76 of the inner hood body 18 and the outer hood body 20 of the first embodiment 12 described above. In the embodiment illustrated in FIG. 10, a surrounding flange 114 surrounds and extends forward of the web 111 to increase the depth of the elongate horizontal slot 112. A hood 116 extends perpendicular to the web 111 about a portion of the periphery of the web 111. An internally threaded through hole 118 is provided in a forward portion of the hood 116 to receive the tensioning screw 96.

The second embodiment 14 is assembled simply by inserting the elongate extended boss 102 of the slider 94 into the elongate horizontal slot 112 of the hood body 92. Thereafter the threaded fasteners 98, 100 can be threaded into the threaded holes 104, 106 at the distal end of the elongate extended boss 102. When assembled, the bottom 120 of the hood 116 abuts the flat top 122 of the slider 94 to prevent rotation therebetween. Likewise, the top and bottom surfaces of the elongate extended boss 102 engage the top and bottom surfaces of the elongate horizontal slot 112 to prevent rotation between the slider and the hood body. Thus, these relationships act to bear loads imposed on the slider and the hood body 92 by use and enable the threaded fasteners 98, 100 to be substantially only in tension. A bicycle axle may be positioned to tension an associated belt using the second embodiment 14 of the sliding dropout in the same manner as the first embodiment 12 of the sliding dropout described above.

As depicted in FIG. 1, an upper surface of the hood 116 can be attached to a seat stay 86 and the forward surface of the hood 116 attached to a chain stay 88. The attachment may be accomplished in the same manner as the first embodiment 12 as described above.

In both embodiments 12, 14 of the sliding dropout depicted herein, the axle receptacle comprises a vertical dropout with a forward surface angled counterclockwise from vertical relative to the opening. The incline of the top surface 40 may be a small acute angle from vertical, ranging from 1°-15°. In one embodiment the angle is about 10°. Alternatively, the top surface 40 could be vertical or could be angled clockwise at a small acute angle from vertical. The diameter of the receiving hole could be approximately equal to the diameter of a wheel axle received therein or may be slightly larger.

Another feature of the axle receptacle 24 shown in FIG. 3 is that the axle receptacle 24 is disposed more forward on the slider 120, rather than cantilevered rearward, to better distribute loads through the sliding dropout. As shown in FIG. 3, the axle receptacle 24 is disposed horizontally between the two internally-threaded holes 28, 30 of the extended boss 22, thus minimizing torque loads from being distributed through the extended boss 22 and the horizontal slots 66, 82 interface.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A bicycle sliding dropout comprising:
   a slider, the slider comprising an axle receptacle; and
   a splitting body, the splitting body comprising a first body part and a second body part, the first body part and the second body part each having a vertical face abutting a vertical face of the other, the vertical faces of the first body part and the second body part being releasably secured to each other, the splitting body and the slider being configured for slidable engagement relative to one another when operatively associated, so that the slider may slide fore and aft relative to the splitting body; and
   at least one screw radially spaced from the axle receptacle configured to secure the slider in a select position fore and aft relative to the splitting body and to releasably secure the vertical faces of the first and second body parts to each other by compressing the slider and first and second body parts together.

2. The bicycle sliding dropout of claim 1 wherein the slider and the splitting body are configured for slidable engagement by an extended boss on the slider and a substantially horizontal slot defined by the split body configured to receive the extended boss.

3. The bicycle sliding dropout of claim 2 wherein the first body part defines a substantially horizontal slot and the second body part defines a substantially horizontal slot aligned with the horizontal slot of the first body part with the vertical faces of the first body part and the second body part abutted, the substantially horizontal slots of the first and second body parts defining the substantially horizontal slot of the splitting body.

4. The bicycle sliding dropout of claim 1 further comprising the first and second body parts being configured to matingly engage via a mechanical interlock with their vertical faces abutting, the mechanical interlock comprising a flange and groove interface between the first and second body parts configured to substantially prevent movement of the first and second body parts relative to one another horizontally, vertically or rotationally with the vertical faces of the first and second body parts abutted vertically and matingly engaged.

5. The bicycle sliding dropout of claim 3 wherein the extended boss and the horizontal slots of the first and second body parts are configured so that with the extended boss received in the slots, relative rotation between the slider, the first and second body parts is substantially prevented.

6. The bicycle sliding dropout of claim 3 further comprising mechanical interlock between the abutting vertical faces of the first and second body parts, the mechanical interlock comprising a flange and groove interface between the first and second body parts configured to substantially prevent movement of the first and second body parts relative to one another horizontally, vertically or rotationally with the first and second body parts abutted vertically and matingly engaged and wherein the flange protrudes from near the periphery of the substantially horizontal slot of one of the first and second body parts and wherein the groove is disposed near the periphery of the substantially horizontal slot of the other of the first and second body parts.

7. The bicycle sliding dropout of claim 2 wherein the extended boss further comprises at least one internally-threaded hole in a distal end thereof.

8. The bicycle sliding dropout of claim 1 wherein one of the first and the second body parts further comprises an upper hood.

9. The bicycle sliding dropout of claim 8 wherein the upper hood comprises a bottom surface, wherein the slider further comprises an upper surface, and wherein the upper surface of the slider is configured to abut the bottom surface of the upper hood in a manner substantially preventing rotation therebetween.

10. The bicycle sliding dropout of claim 8 wherein the other of the first and second body parts further comprises a forward hood.

11. The bicycle sliding dropout of claim 10 wherein the forward hood comprises an internally-threaded hole.

12. The bicycle sliding dropout of claim 10 wherein the forward hood is attached to a bicycle chain stay.

13. The bicycle sliding dropout of claim 10 wherein the upper hood is attached to a bicycle seat stay.

14. The bicycle sliding dropout of claim 10 wherein the first body part and second body part are configured so that the forward hood and upper hood cooperate to abut and define a substantially continuous surface with the first and second body parts abutted vertically and matingly engaged.

15. The bicycle sliding dropout of claim 1 wherein the axle receptacle is aligned generally vertically, the axle receptacle comprising a downward facing opening, a forward surface, and an aft surface, and a receiving hole inset into the forward surface such that an axle may be received in the receiving hole.

16. The bicycle sliding dropout of claim 15 wherein the forward surface is inclined counterclockwise from vertical relative to the opening, the forward surface terminating at the receiving hole opposite the opening.

* * * * *